United States Patent

[11] 3,589,253

[72] Inventor Irving Erlichman
 Wayland, Mass.
[21] Appl. No. 763,883
[22] Filed Sept. 30, 1968
[45] Patented June 29, 1971
[73] Assignee Polaroid Corporation
 Cambridge, Mass.

[54] FOLDING CAMERA
 29 Claims, 5 Drawing Figs.
[52] U.S. Cl. .................................................. 95/11,
 95/39
[51] Int. Cl. .............................................. G03b 19/00
[50] Field of Search ........................................... 95/11, 13,
 39

[56] References Cited
 UNITED STATES PATENTS
 2,880,659 4/1959 Land et al. .................. 95/13
 3,326,103 6/1967 Topaz ........................ 95/10 C
 3,447,437 6/1969 Tiffany ...................... 95/13

Primary Examiner—Samuel S. Matthews
Assistant Examiner—Alan Mathews
Attorneys—Brown and Mikulka and Robert E. Corb ABSTRACT: A self-developing camera adapted to be folded into a compact form which is very small relative to the picture size. The camera includes three housing sections pivotally connected to one another for movement between a folded position and an erect position in which the sections define three sides of a light-tight chamber, one section including a lens and shutter, another section including means for locating a photosensitive element in position for exposure, and the third section including a mirror for reflecting light from the lens toward a photosensitive element positioned for exposure; and erecting system including a pair of support members for rigidly retaining the housing sections in the erect position; and means such as a viewfinder, a rangefinder, and/or means for supporting a photoflash unit, mounted on the support member for movement between a folded position in which the last-mentioned means are engaged in an external recess and erect position in which these means are operatively oriented with respect to the lens axis.

PATENTED JUN 29 1971

INVENTOR.
Irving Erlichman
BY Brown and Mikulka
and
Robert E. Corb
ATTORNEYS

FIG.5

FOLDING CAMERA

The present invention is concerned with a folding, self-developing camera of the type adapted to be employed with a film pack including a plurality of film units each comprising all of the materials required to produce a photographic print when the film unit is processed following exposure by moving it between a pair of pressure-applying members in the camera. A camera of this type is shown and described, for example, in the copending U.S. Pat. application of Edwin H. Land et al., Ser. No. 655,850, filed July 25, 1967, and now abandoned having an especially high degree of compactness (relative to image size) in the folded condition of the camera. Compactness is achieved by providing a camera housing comprising three sections including a first or main section for holding a film pack with the photosensitive element of a film unit located in position for exposure, a third section pivotally connected to the first section and including a lens and shutter and a second section pivotally connected to the first section near the end thereof opposite the lens and shutter and including a mirror for reflecting light from the lens toward a photosensitive element positioned for exposure within the first section. In the erect or operative position of the camera housing sections, the planes of the mirror and the photosensitive element are both located at angles (preferably other than 90° with respect to the lens axis, and the three housing sections cooperate to define sides of a lighttight chamber, the other sides of which are defined by extensible bellows or the like, for transmitting light from the lens via the mirror to a photosensitive element. The camera in the folded position assumes the form of a relatively thin, elongated parallelepipedon, having length and width dimensions which do not exceed by any substantial extent, those of the self-developing film pack with which the camera of the invention is adapted to be employed.

The camera includes an erecting system for rigidly retaining the housing sections in the erect position with the various components including the lens, mirror, and photosensitive element in a predetermined relationship that is required to be maintained within very narrow tolerance limits; while also permitting the camera housing sections to be readily and easily moved between the folded and erect positions. The requisite rigidity of the erect camera structure is obtained by providing an erecting system including a link between the first or main housing section which includes the means for locating the photosensitive element and the second housing section which includes the mirror, cooperating with the housing sections to form, in the erect position, a first rigid triangular structure including the housing sections as two sides thereof; and a connecting member joined to the third housing section which includes the lens and shutter and the second section, cooperating with the third section and the link to form a second triangular structure in which the third housing section is a side and having a side, i.e., the link, in common with the first triangular structure.

Although the components previously enumerated and described comprise the essential elements of a complete, operative folding camera, the utility and convenience of and the results obtainable with, the camera are enhanced and improved by providing "auxiliary" elements and systems which cooperate with the essential elements of the camera to facilitate and/or make possible the use of the camera. These other elements and systems include, for example, a viewfinder for orienting the camera with respect to the subject; a variable focus objective lens together with means for measuring the distance between the camera and the subject and/or adjusting the focus of the lens; means enabling the camera to be positioned at a known or predetermined distance from a subject; means for measuring the illumination of the subject and/or controlling an exposure parameter such as duration or relative aperture; and means for directing radiation toward the subject such as a photoflash device for illuminating the subject. All of these last-mentioned auxiliary devices have one thing in common—they must be predeterminedly oriented with respect to the lens of the camera in order to receive radiation, e.g., light, from or transmit radiation toward the subject being photographed. Another common feature is that each includes at least a component that is permanently associated with the essential elements of the camera structure, thus requiring that provision be made for operatively positioning the auxiliary component in the erect position of the camera while accommodating the component within the boundaries of the camera structure in the folded position thereof.

Objects of the invention are: to provide in a camera structure of the type described, a novel and improved erecting system including means for operatively orienting an auxiliary device with respect to the lens of the camera in the erect position of the camera and moving the auxiliary device into a storage position when the camera is folded; and to provide an exceptionally compact, when folded, camera structure of the type described including provision for storing the auxiliary device in the folded position of the camera.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Reference is now made to FIGS. 1 through 4 of the drawings wherein there is shown a self-developing camera 10 embodying the invention. Camera 10 comprises a housing including a first or main section 12, a second section 14, and a third section 16 incorporating a lens and shutter assembly. First housing section 12 is in the form of a relatively thin parallelepipedon and includes a rear wall 18 provided with a door 20, sidewalls 22 and inner wall 24 formed with an exposure aperture 26 for locating a film pack or assembly of film units in position for exposure.

Figure 1:
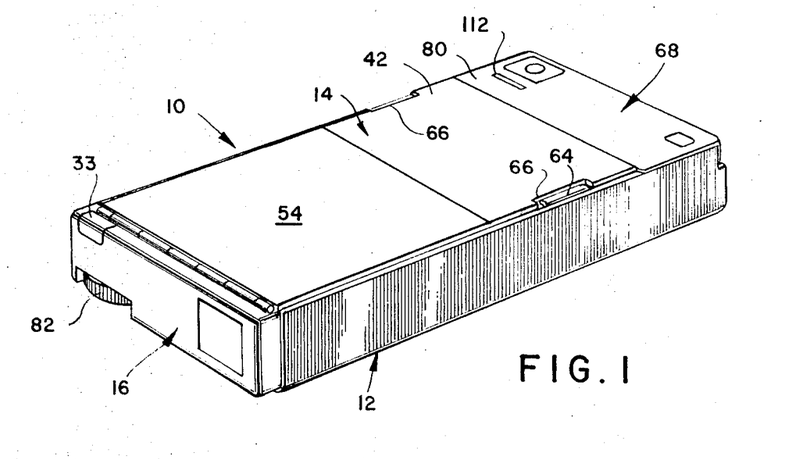
FIG. 1 is a perspective view of a camera embodying the invention shown in a folded position.
Figure 2:
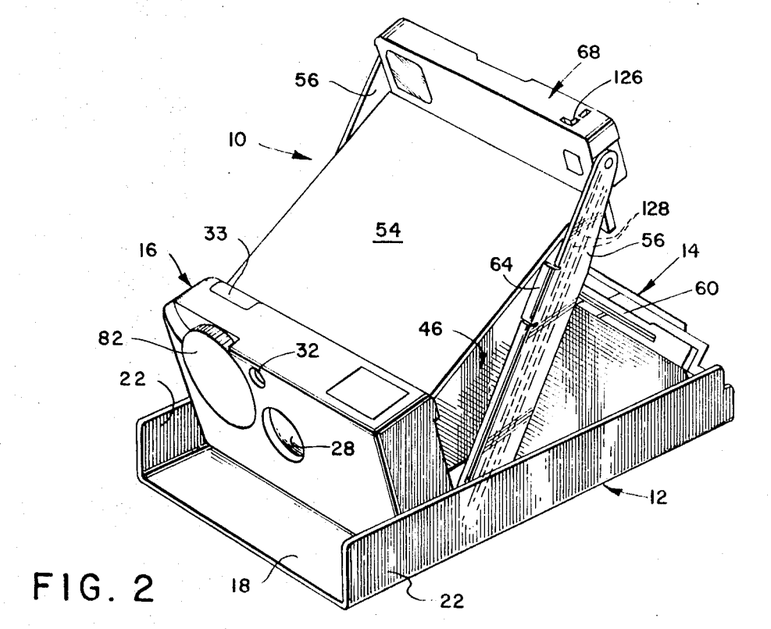
FIG. 2 is a perspective view of the camera shown in an erect or operative position.
Figure 3:
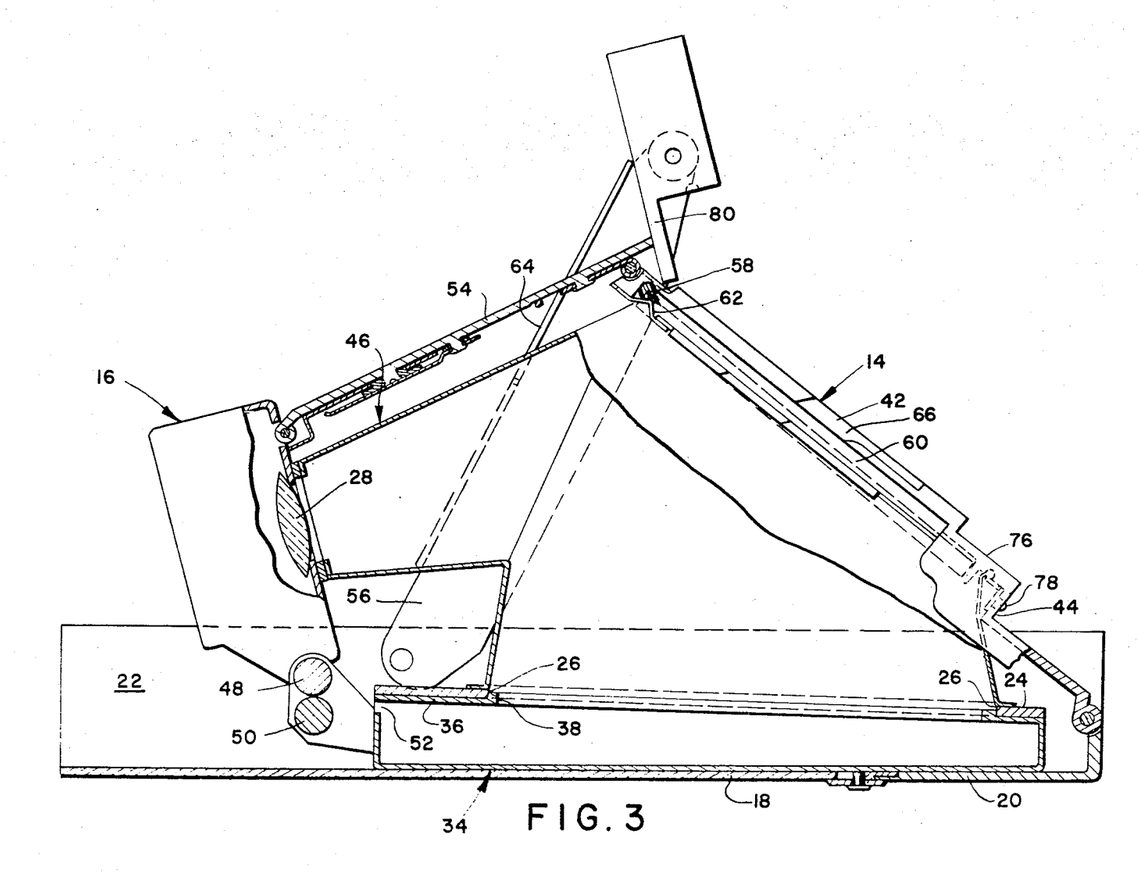
FIG. 3 is an elevational view, partially in section, showing the camera in erect position.
Figure 4:
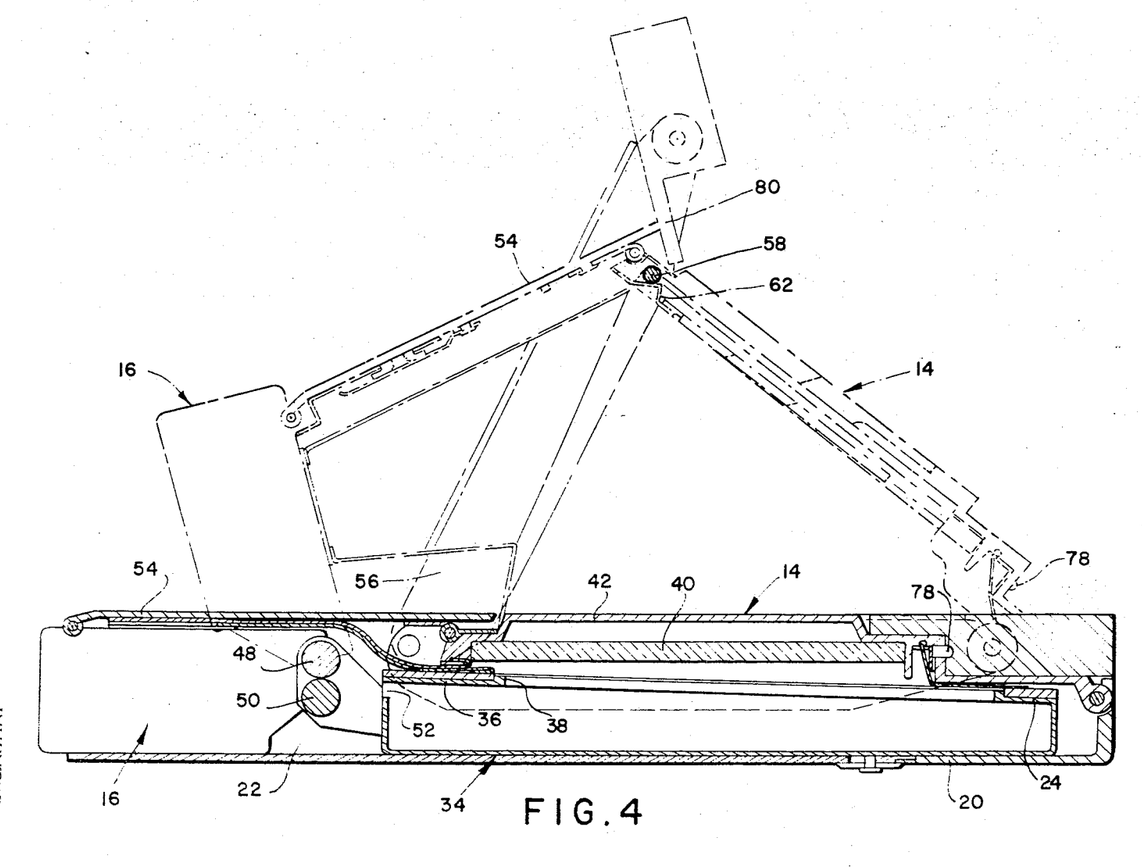
FIG. 4 is a sectional view similar to FIG. 3 showing the camera in folded position.

Third housing section 16 is also generally parallelepiped in shape, having a thickness dimension (measured along the optic axis) slightly less than the thickness of main housing section 12 and pivotally mounted on the main housing section between sidewalls 22 for pivotal movement between a folded position shown in FIGS. 1 and 4 in which the third housing section is engaged between sidewalls 22 and an erect or operative position shown in FIGS. 2 and 3 in which the third housing section is pivoted from the folded position through an angle of less than 90°, e.g., approximately 70° to 75°, with respect to the main section. The camera is provided with an exposure means including an adjustable focus objective lens 28, shown in FIG. 5 as mounted in a rotatable, threaded barrel 30 and a conventional photographic shutter, preferably of the automatic photoresponsive type, enclosed within the third housing section 16. A window 32 (see FIG. 2) is provided in the forward wall (when erect) of the third housing section for admitting light to a photocell for controlling the operation of the shutter; and a shutter release button 33 is provided in that wall of the third housing section which is uppermost in the erect position and institutes the end wall when folded The camera is adapted to be employed with an assemblage of self-developing film units of the type shown and described in the copending U.S. Pat. application of Edwin H. Land, Ser. No. 622,287, filed Mar. 10, 1967, and comprising a container 34 having a forward wall 36 with an exposure aperture 38 for holding the plurality of film units with the forwardmost film unit supported against forward wall 36 and the photosensitive element thereof positioned for exposure by light transmitted through exposure aperture 38. The inner wall 24 provides means for locating a photosensitive element in position for exposure and accordingly, is located substantially at a plane near the focal surface of lens 28 at an acute angle with respect to the optic axis of the lens. A mirror 40 is provided mounted on the inside of second housing section 14 in position in the erect position of the camera to redirect light from lens 28 toward a photosensitive element located for exposure behind exposure aperture 26 in inner wall 24. The reflecting surface of the mirror is preferably located at an angle other than 45° with respect to the optic axis of the lens and at an acute angle with respect to the plane of the inner wall when the camera housing sections are in erect position.

Second housing section 14 is connected to one end of first housing section 12 for pivotal movement with respect to the first housing section between the erect position shown in FIGS. 2 and 3 and a folded position in which the second housing section is engaged between sidewalls 22 with mirror 40 located closely adjacent inner wall 24. Second housing section 14 included an outer wall 42 including a planar portion having an outer surface disposed substantially in the same plane as the forward edges of sidewalls 22 when the camera is folded, so as to define a section of the forward wall of the folded camera and a recessed section 44 located near the end at which the housing section is pivotally connected to the main housing section and cooperating with sidewalls 22 to provide, in the folded position of the camera, an external recess, the function of which will be described more fully hereinafter.

The three camera housing sections are adapted, in the erect position, to provide three sides of a lighttight chamber for transmitting light from lens 28 via mirror 40 to a photosensitive element positioned for exposure behind inner wall 24. The remaining sides of this lighttight chamber are defined by an extensible bellows or similar structure shown as an envelope 46, preferably formed of a light-opaque, elastomeric material, having three openings at which the envelope is secured to inner wall 24 around exposure aperture 26, to the interior surface of wall 42 of second housing section 12 around mirror 40, and to the inner wall of third housing section 16 around lens 28. For more details of the construction of the envelope, reference may be had to the copending U.S. Pat. application of Irving Erlichman, Ser. No. 663,719, filed Aug. 28, 1967 and now abandoned.

The camera is preferably of the self-developing type and includes means for processing each photographic film unit following exposure thereof, preferably to produce a positive transfer print in the film unit. The means for processing the film unit include a pair of pressure-applying rolls 48 and 50 mounted in juxtaposition within the main housing section 12, roll 48, in the form shown, being mounted for rotation about the pivotal axis of third housing section 16. The camera includes suitable means, such as a motor, mounted in third housing section 16 and a transmission, for driving the rolls together with means for feeding each film unit, following exposure thereof, from container 34 through an opening 52 in an end wall of the container into the nip of rolls 48 and 50 which are rotated to advance the film unit directly from the camera while simultaneously applying compressive pressure to the film unit to distribute a processing liquid therein.

In accordance with the invention, the camera includes erecting means for supporting the three housing sections, including the lens, mirror, and photosensitive element in operative or erect position while readily permitting the housing sections to be folded into an especially compact form. The erecting means are required to locate the three housing sections very accurately and precisely in predetermined positions relative to one another and rigidly maintain the relative positions of the three housing sections at least during exposures. In the form shown, the erecting means include a connecting element in the form of a wall 54 pivotally connected near one edge to the end of second housing section 14 opposite the end at which the second housing section is pivotally connected to the first housing section and at its opposite edge to third housing section 16, at a position thereon remote from the location at which the third housing section is pivotally mounted on the first housing section. Wall 54 functions to protect a section of envelope 46 and, in the folded position of the camera, provides a section of the outer forward wall of the camera.

The erecting means also include a pair of support members or links 56 adapted to cooperate, in the erect position of the camera, with the three housing sections and wall 54 to form at least one rigid triangular structure and another essentially triangular structure having a common side. Each of support members 56 is retaining mounted on first housing section 12 adjacent the sides thereof between sidewalls 22 and second housing section 14 in a position intermediate the ends of main housing section closely adjacent the axis at which the third housing section is 180 connected 186 East 166 member 56 includes an inwardly projecting stud or pin 58 located intermediate its ends, more proximate to the end furthest from the main housing section. The second housing section 14 is provided on its sides with channels or grooves 60 and studs 58 are engaged for sliding movements in channels 60, between an erect position in which the studs are engaged closely adjacent the pivotal connection between housing section 14 and wall 54 in conforming end sections of the channels, and a folded position in which the studs are located more proximate the opposite end of the second housing section. Detent springs 62 are provided on the second housing section for engaging and releasably retaining the studs 58 at the ends of channels 60 in the erect position of the camera. It will be apparent that in the erect position, the main housing section 12, second housing section 14 and each support member 56 cooperate to define three sides of a rigid, triangular structure in which pivotal movement of second housing section 14 with respect to the main housing section is prevented by engagement between each stud 58 and the sides of the channel 60 in which the stud is engaged. As a result of the immobilization of the pivotal connection between the support members and the main housing section, the triangular structure, including the main housing section, functions as a rigid link in what is in effect a second triangular structure, including as two sides thereof the third housing section 16 and wall 54, thus providing for as especially rigid overall camera structure in the erect position thereof. Moreover, the triangular structure defined by each support member and the first and second housing sections has an element, (i.e. the support member), in common with the essentially three-sided structure defined by wall 54, the third housing section 16 and the support member, thereby forming a rigid overall structure.

The camera can be easily and readily folded by pivoting support members 56 in a clockwise direction, viewing FIGS. 3 and 4, so as to slide studs 58 toward the opposite ends of channels 60 and in the process disengage the studs from detent springs 62. Means to be described more fully hereinafter are provided for imparting the initial sliding movement to the studs to disengage them from the springs. Support members 56 also cooperate to retain the camera in the folded position and for this purpose are provided with inwardly projecting flanges 64 which, in addition to stiffening the support members, engage edge portions of second housing section 14 in the folded position of the camera to retain the second housing section in folded position. The outer surface of wall 42 is provided with recesses 66 for accommodating flange 64 so that they do not extend or project above the outer surface of wall 42 when the camera is folded.

As previously noted, the utility and ease of operation of the camera, as well as the results which can be achieved thereby with the camera, are considerably enhanced by the addition to the basic components of the camera, including the exposure system, housing, and means for locating a photosensitive element in position for exposure of auxiliary means. In the form shown in the drawings, these auxiliary means may comprise a conventional rangefinder-viewfinder designated 68, shown in FIG. 5 as including a fixed, semitransparent mirror 70 and a pivotable mirror 72, the latter being mounted on a pivot arm 74 and both mirrors being enclosed in a suitable housing provided with windows enabling the operator to view the subject being photographed directly through the semitransparent mirror and also to see an image of the subject reflected by both mirrors. It is apparent that for the viewfinder and rangefinder to operate effectively, they must be predeterminedly oriented with respect to the optic axis of lens 28. For example, the viewfinder may be considered to have an optic axis along which light is transmitted from the subject to the eye of the viewer, and this optic axis is located in generally parallel relation with the optic axis of the objective lens. Not only is it necessary to accurately locate the viewfinder and rangefinder or other auxiliary device which receives light from or transmits light to the subject being photographed, but this accurate positioning must be maintained with the same degree of rigidity as the positioning of the housing sections and components of the exposure system. In addition, the auxiliary device, such as the rangefinder-viewfinder, must be stored within the boundaries of the parallelepiped structure of the folded camera. This is accomplished in the structure shown by pivotally mounting the rangefinder-viewfinder at its ends on the ends of support members 56 and providing the rangefinder-viewfinder with a generally rectangular closed section, such that in the folded position of the camera it fits within the external recess defined by recessed section 44 of outer wall 42 and sidewalls 22 with the forward and upper surfaces (in the erect position) of the rangefinder-viewfinder acting as portions of the forward and end walls of the folded camera housing.

Means in the form of torsion springs (not shown) are engaged between support members 56 and the rangefinder-viewfinder for biasing the latter in a clockwise direction so that it seats within the aforementioned recess, as shown in FIGS. 1 and 4, and the rangefinder-viewfinder is provided with a flange 80 adapted to be engaged by end portion of connecting wall 54 during the terminal portion of the movement of the camera housing sections into erect position thereby pivoting the rangefinder-viewfinder against the biasing of the torsion springs into a position in which the rangefinder-viewfinder is correctly oriented with respect to the optic axis of the objective lens. The torsion springs then function to retain the flange against the connecting wall, thereby effectively maintaining the proper orientation. To fold the camera, the rangefinder-viewfinder may be grasped and pivoted in a clockwise direction, thereby urging studs 58 from engagement with springs 62, commencing the pivotal movement of the support members and housing sections into the folded position. an outer wall 42 is provided with a shallow recessed section 76 in which flange 80 is seated in the folded position of the camera so as to provide an essentially flush forward surface for the folded camera. A spring detent 78 is provided on recessed section 44 for engaging the rangefinder-viewfinder and retaining the latter within the recess provided therefor. The camera can be unfolded or erected by manually engaging and moving the rangefinder-viewfinder from the recess in which it is seated in the folded position of the camera.

Figure 5:
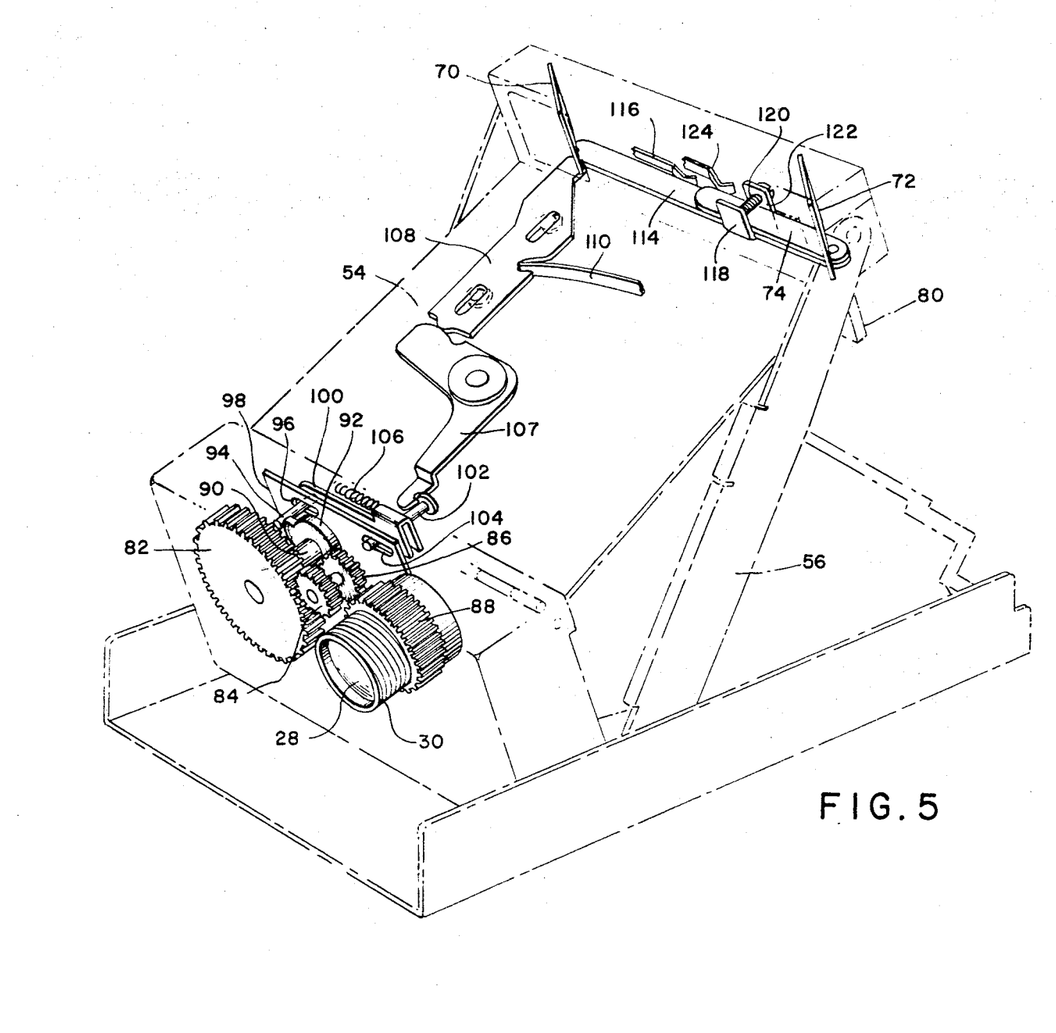
FIG. 5 is a perspective view of certain components of the camera, the camera housing being illustrated in broken lines in erect position.

Means are provided for coupling the rangefinder to the adjustable focus lens in the erect position of the camera housing. These means, illustrated in FIG. 5, are adapted to convert the rotary motion of lens barrel 30 to a pivotal motion of arm 74 on which mirror 72 is mounted, as well as to provide means for manually rotating the lens barrel to focus the lens. The last-mentioned means include a large gear 82 mounted on the front of the shutter housing so as to be manually engageable, coupled through idler gears 84 and 86 to a gear 88 secured on lens barrel 30. Large gear 82 is keyed to a shaft 90 on which is mounted a cam 92 engaged with a pin-shaped follower 94 engaged for sliding movement in a slot 96 in a plate 98 within the third housing section and mounted on a link 100 near one end of the link. A second pin 102 is mounted on link 100 near the opposite end thereof and engaged for sliding movement in a slot 104 in plate 98. A spring 106 is provided for retaining follower pin 94 against cam 92. One end of second pin 102 projects rearwardly from the camera housing adjacent the inside of wall 54 for engaging a component of a linkage mounted on the inside of the wall for connecting second pin 102 in the third housing section to rangefinder-viewfinder 68.

The last-mentioned linkage comprises an L-shaped crank 107 pivotally mounted on the inside of wall 54 with one arm of the crank engaged, in the erect position, with second pin 102 and the other arm engaged with a link 108 mounted on the inside of the wall for linear movement toward and away from the rangefinder-viewfinder in the erect position thereof. A cantilever spring 110 is provided for urging one end of link 108 into engagement with an arm of crank 107. The other end on link 108 extends, in the erect position of the camera housing, through an opening 112 in the forward wall of the rangefinder-viewfinder into engagement with the free end of an elongated arm 114 mounted for pivotal movement at its opposite end within the rangefinder-viewfinder housing. A spring 116 is engaged with arm 114 for pivoting the arm so as to retain it against the end of link 108. An adjustable coupling is provided between arm 114 and arm 74 on which mirror 72 is mounted and comprises a flange 118 on arm 114 engaged with a screw 120 threaded through flange 122 on arm 74, the position of the screw being adjustable to vary the position of mirror 72 respect to the position of the lens. A spring 124 engaged with arm 74 urges screw 120 into contact with flange 118 such that the rotation of cam 92 in a counterclockwise direction is effective to move link 100 against the bias of spring 106, link 108 against the bias of spring 110, and arms 114 and 74 against the bias of, respectively, springs 116 and 124, the springs in each case providing for the return of the respective displaced elements when the lens barrel is rotated in the opposite direction.

Other so-called auxiliary devices adapted to aid or facilitate the making of exposures with the camera and which have as a feature in common with the rangefinder-viewfinder, the need for a predetermined orientation with respect to the optic axis of the lens, include such means as a photometer for sensing the illumination of the subject, and light-producing means such as photoflash apparatus for illuminating the subject during exposure; and accordingly, such other devices or means for coupling the devices to the camera may also be included in or mounted on the rangefinder-viewfinder housing. For example, a receptacle 126 may be provided in the upper (when erect) wall of the rangefinder-viewfinder housing for mounting a photoflash device and making the necessary electrical connections thereto for actuating the device in synchronism with the operation of the shutter. An electrical conductor 128 may be provided in a recess on the inside of one of support members 56 for electrically coupling receptacle 126 to the shutter.

The electrical conductor 128 can be a flexible material, at least in part, and in the type camera shown in FIG. 2 would be mounted on support link 56. Electrical means, such as shown in U.S. Pat. No. 3,326,103, 103 issued June 20, 1967, in the name of J. M. Topaz for "Auxiliary Shutter Timing Mechanism," can be mounted in the camera body in any suitable location to bring about a synchronization of the photocell controlled shutter and the photoflash system. It is also well within the inventive concept herein described to provide an electrical conductor to transmit electrical signals between the rangefinder-viewfinder and the exposure means in the form of a nonflexible conductor bridging the space between the first and second sections or by using the link 56 itself. The precise form of the electrical conductor connecting the aforementioned sections can be left to the designer of the system as long as a conductor is used that will allow an electrical connection to be established between the first and second sections when the sections are moved between stored and operative positions.

The exposure parameters determined by the shutter, specifically, relative aperture and exposure duration, may be subject to control by a system including means such as a photocell responsive to light from the subject or a photometric system involving the operator such as a comparison photometer in which light from the subject is compared against a standard source. In these last-mentioned instances, the photocell or the comparison photometer may be mounted within the rangefinder-viewfinder housing so as to be properly oriented with respect to the optic axis of the lens when the camera is erected. Other visually controlled systems for varying exposure parameters include systems requiring the operator to observe an indicator visible within the field of view of the viewfinder and/or rangefinder so that such a system might also be incorporated in the rangefinder-viewfinder and coupled to the camera shutter by electrical conductors secured to support members 56.

It should be apparent from the foregoing that the present invention provides a relatively compact when folded self-developing camera structure capable, when unfolded or erected, of producing a relatively large photographic print. This compactness is achieved, not only by providing an exposure system including a shutter, a mirror, and film-holding means in three separate and relatively movable housing sections, but by providing a novel and improved structure for retaining the camera in both the erect and folded positions and for erecting and storing auxiliary structure such as a rangefinder-viewfinder. This latter structure includes an improved erecting system which provides for more rigid and accurate positioning of the various camera components relative to one another in the erect position, together with structure for storing the rangefinder-viewfinder in an external recess in the folded position position of the camera in such a way as to be readily and easily erected while not increasing the bulk or dimensions of the folded camera.

Since certain changes may be made in the above apparatus without departing from the scope of the invention herein involved, it is intended that all matter contained in the above description or shown in the accompanying drawings shall be interpreted as illustrative and not in a limiting sense.

What I claim is:

1. A compact folding camera comprising, in combination:
   exposure means;
   a housing including at least first and second sections;
   one of said housing sections including means for locating a photosensitive element in position for exposure to light from said exposure means;
   said sections being movable relative to one another between a folded position and an erect position in which said sections define sides of a lighttight chamber for transmitting light from said exposure means to a photosensitive element located in position for exposure and said exposure means are located relative to said one housing section in position to transmit light from a subject to said photosensitive element;
   support means coupled between said sections for supporting said sections in said erect position; and auxiliary means mounted on said support means for movement relative to said housing sections between a storage position and an operative position wherein said auxiliary means are predeterminately oriented with respect to said exposure means to receive light from or direct toward a subject located with respect to said exposure means in position to be photographed by said camera.

2. A camera as defined in claim 1 wherein said housing sections include portions providing an external recess for containing said auxiliary means in said folded position of said camera.

3. A camera as defined in claim 2 wherein said recess is located externally of said housing at one extremity thereof.

4. A camera as defined in claim 2 wherein said camera housing, in said folded position, assumes substantially the form of a relatively thin parallelpipedon with said auxiliary means defining an outer portion of said camera housing.

5. A camera as defined in claim 4 wherein said auxiliary means are in the form of a parallelpipedon.

6. A camera as defined in claim 2 including pivot means coupling said housing sections to one another for pivotal movement between said folded and erect positions.

7. A camera as defined in claim 6 wherein said recess is located externally of said housing near one extremity of said first housing section and said pivot means.

8. A camera as defined in claim 6 wherein said first and second housing sections are pivotally connected adjacent one extremity thereof, said camera includes a third housing section defining a side of said lighttight chamber pivotally connected to said first housing section near the opposite extremity thereof and a connecting member coupled between said third housing section and said second housing section.

9. A camera as defined in claim 1 wherein said exposure means are adjustable to vary a parameter of the exposure and said auxiliary means include photoresponsive means for receiving light from said subject in said erect position of said camera, said camera including means coupling said photoresponsive means with said exposure means to adjust said exposure means and vary said exposure parameter.

10. A camera as defined in claim 1 wherein said support means include a pair of support members each coupled, in said erect position, near one end of said support member to one of said housing sections and intermediate its end to the other of said housing sections and said auxiliary means are mounted on said support members near the other ends thereof.

11. A camera as defined in claim 1 wherein said auxiliary means include electrical means operative in combination with said exposure means to determine exposures, said camera including electrically conductive means associated with said support means electrically coupling said electrical means and said exposure means.

12. A camera as defined in claim 11 wherein said conductive means are carried at least in part by movable components of said support means and maintain electrical coupling between said electrical means and said exposure means during movement of said sections and said auxiliary means relative to one another.

13. A camera as defined in claim 11 wherein said electrical means include a component or light-producing means for illuminating a subject being photographed, said component being required to be operated in synchronism with said exposure means.

14. A camera as defined in claim 11 wherein said exposure means are adjustable to vary a parameter of the exposures made thereby and said electrical means include photoresponsive means for receiving light from said subject in said erect position of said camera.

15. A compact folding camera comprising, in combination:
   exposure means;
   a housing including at least first and second sections;
   one of said housing sections including means for locating a photosensitive element in position for exposure to light from said exposure means;
   said sections being movable relative to one another between a folded position and an erect position in which said sections define sides of a lighttight chamber for transmitting light from said exposure means to a photosensitive element located in position for exposure and said exposure means are located relative to said one housing section in position to transmit light from a subject to said photosensitive element;
   support means coupled between said sections for supporting said sections in said erect position;
   means mounted on said support means for movement between a storage position and an operative position wherein the last-mentioned means are predeterminately oriented with respect to said exposure means to receive light from or direct light toward a subject located with respect to said exposure means in position to be photographed by said camera;

said housing sections including portions providing an external recess for containing said last-mentioned means in said folded position of said camera, said last-mentioned means being manually engageable in said folded position to move said sections into said erect position.

16. A camera as defined in claim 15 wherein said recess is formed in said second housing section and the latter includes means for releasably retaining said last-mentioned means in said recess.

17. A camera as defined in claim 16 wherein said support means include means for engaging and retaining said second housing section in said folded position.

18. A compact folding camera comprising, in combination:
a housing including first, second, and third sections;
said first and second housing sections being pivotally connected to one another adjacent one extremity of said first section, said third housing section being pivotally connected to said first housing section near the opposite extremity thereof;
a connecting member coupled between said second and third housing sections;
exposure means mounted in said third housing section;
said first housing section including means for locating a photosensitive element in position for exposure to light from said exposure means;
means mounted in said second housing section for directing light from said exposure means toward a photosensitive element positioned for exposure within said housing;
said sections and said connecting member being movable relative to one another between a folded position and an erect position in which said sections define sides of a lighttight chamber for transmitting light from said exposure means to a photosensitive element located in position for exposure and said exposure means are located relative to said first and second housing sections in position to transmit light from a subject to the photosensitive element;
support means coupled between said first and second housing sections for supporting said housing sections in said erect position; and
means mounted on said support means for movement between a storage position and an operative position wherein the last-mentioned means are predeterminately oriented with respect to said exposure means to receive light from or direct light toward a subject located in position to be photographed by said camera.

19. A camera as defined in claim 18 wherein the last-mentioned means include a reflector.

20. A compact folding camera comprising, in combination:
a housing including first, second, and third sections;
said first and second housing sections being pivotally connected to one another adjacent one extremity of said first section, said third housing section being pivotally connected to said first housing section near the opposite extremity thereof;
a connecting member coupled between said second and third housing sections;
exposure means including an adjustable focus optical system mounted in said third housing section;
said first housing section including means for locating a photosensitive element in position for exposure to light from said exposure means;
means mounted in said second housing section for directing light from said exposure means toward a photosensitive element positioned for exposure within said housing;
said sections and said connecting member being movable relative to one another between a folded position and an erect position in which said sections define sides of a lighttight chamber for transmitting light from said exposure means to a photosensitive element located in position for exposure and said exposure means are located relative to said first and second housing sections in position to transmit light from a subject to the photosensitive element;
support means coupled between said first and second housing sections for supporting said housing sections in said erect position;
means mounted on said support means for movement between a storage position and an operative position wherein the last-mentioned means are predeterminately oriented with respect to said exposure means to receive light from or direct light toward a subject located in position to be photographed by said camera; and
means coupled with said last-mentioned means for adjusting the focus of said optical system.

21. A camera as defined in claim 20 wherein said last-mentioned means include a rangefinder.

22. A compact folding camera comprising, in combination:
a housing including first, second, and third sections;
said first and second housing sections being pivotally connected to one another adjacent one extremity of said first section, said third housing section being pivotally connected to said first housing section near the opposite extremity thereof;
a connecting member coupled between said second and third housing sections;
exposure means mounted in said third housing section;
said first housing section including means for locating a photosensitive element in position for exposure to light from said exposure means;
means mounted in said second housing section for directing light from said exposure means toward a photosensitive element positioned for exposure within said housing;
said sections and said connecting member being movable relative to one another between a folded position and an erect position in which said sections define sides of a lighttight chamber for transmitting light from said exposure means to a photosensitive element located in position for exposure and said exposure means are located relative to said first and second housing sections in position to transmit light from a subject to the photosensitive element;
support means coupled between said first and second housing sections for supporting said housing sections in said erect position; and
means mounted on said support means for movement between a storage position and an operative position wherein the last-mentioned means are predeterminately oriented with respect to said exposure means to receive light from or direct light toward a subject located of in position to be photographed by said camera;
said connecting member being constructed and arranged to engage said last-mentioned means in said erect position for orienting said last-mentioned means with respect to said exposure means.

23. A camera as defined in claim 22 wherein said last-mentioned means include an optical viewfinder for orienting said camera with respect to a subject to be photographed.

24. A camera as defined in claim 22 wherein said last-mentioned means include at least a component of light-producing means for illuminating a subject being photographed.

25. A compact folding camera comprising, in combination:
a housing including first, second, and third sections pivotally coupled with one another;
exposure means mounted in said third housing section and including an optical system having an axis, for transmitting light from the subject being photographed along said axis;
said first housing section including means for locating a photosensitive element in position for exposure to light from said exposure means;

means mounted in said second housing section for directing light from said exposure means toward a photosensitive element positioned for exposure within said housing;

said sections being pivotable relative to one another between a folded position and an erect position in which said sections define sides of a lighttight chamber for transmitting light from said exposure means to a photosensitive element located in position for exposure and said exposure means are located relative to said first and second housing sections in position to transmit light from a subject to the photosensitive element;

support means coupled between said first and second housing sections for supporting said housing sections in said erect position; and light-transmitting means having an axis and being adapted to transmit light from said subject along said axis, said light-transmitting means being mounted on said support means for movement between a storage position and an operative position wherein said axis of said optical system and said light-transmitting means are in substantially parallel relation.

26. A camera as defined in claim 25 including a connecting member coupled between said third housing section and said second housing section, said connecting member engaging said light-transmitting means for locating said axis thereof in parallel relation with said axis of said optical system when said camera is in said erect position.

27. A camera as defined in claim 25 wherein said exposure means include an adjustable focus optical system, said camera including means coupled with said light-transmitting means for adjusting the focus of said optical system.

28. A camera as defined in claim 27 wherein said last-mentioned means include an optical rangefinder.

29. A camera as defined in claim 28 wherein said means for adjusting the focus of said optical system include linkage means mounted on said connecting member for coupling said optical system with said rangefinder in said erect position of said camera.

UNITED STATES PATENT OFFICE
CERTIFICATE OF CORRECTION

Patent No. 3,589,253          Dated June 29, 1971

Inventor(s) Irving Erlichman

It is certified that error appears in the above-identified patent and that said Letters Patent are hereby corrected as shown below:

Column 3, line 29, "included" read as --includes--. Column 4, line 19, "retaining" read as --pivotally--; column 4, line 23, "180 connected 186 East 166" read as --pivotally connected thereto. Each support--; column 4, line 28, "movements" read as --movement--. Column 5, line 55, "an" read as --An--. Column 6, line 32, after "72" insert --with--; column 6, line 63, remove extra "103" after Patent No. 3,326,103. Column 7, line 67, after "direct" insert --light--. Column 8, line 31, "end" read as --ends--; column 8, line 48, "or" read as --of--.

Signed and sealed this 13th day of June 1972.

(SEAL)
Attest:

EDWARD M. FLETCHER, JR.          ROBERT GOTTSCHALK
Attesting Officer          Commissioner of Patents